(No Model.)

2 Sheets—Sheet 1.

H. B. GALE.
SPEED AND POWER REGULATOR FOR MOTORS.

No. 518,062.

Patented Apr. 10, 1894.

(No Model.) 2 Sheets—Sheet 2.

H. B. GALE.
SPEED AND POWER REGULATOR FOR MOTORS.

No. 518,062. Patented Apr. 10, 1894.

UNITED STATES PATENT OFFICE.

HORACE B. GALE, OF SAN FRANCISCO, CALIFORNIA.

SPEED AND POWER REGULATOR FOR MOTORS.

SPECIFICATION forming part of Letters Patent No. 518,062, dated April 10, 1894.

Application filed June 21, 1893. Serial No. 478,389. (No model.)

*To all whom it may concern:*

Be it known that I, HORACE B. GALE, a citizen of the United States, residing in the city and county of San Francisco and State of California, have invented certain new and useful Improvements in Speed and Power Regulators for Motors, of which the following is a specification, reference being had to the drawings accompanying and forming a part of the same.

My invention relates to that class of regulators by which energy is stored when the quantity produced by the motor is in excess of that demanded by the load upon it, and restored to the system whenever the demand of the load is greater than the supply. In this respect the action of the device is analogous to that of a flywheel. Flywheels, however, on account of the excessive weight which they necessarily assume if designed to store large quantities of energy, are generally useful only to absorb fluctuations of power extending over comparatively short periods of time, such as occur during the different parts of the revolution or cycle of an engine.

The main purpose of my invention is to produce a regulator applicable to any form of motor, which, without having excessive weight in its moving parts, shall render possible the storing and restoring of any desired quantity of energy, and which may serve to neutralize fluctuations of power enduring for comparatively long periods of time, for example for several minutes, or even hours. To accomplish this purpose, I employ, as a means of storing energy, any suitable form of electrical storage battery, and as the moving or revolving body, which replaces the flywheel of the older constructions, the armature of a dynamo electric machine, constructed and connected to the storage battery in a manner to be more fully explained hereinafter, so that when revolving with the desired speed in a constant direction it may act either as a generator, absorbing surplus energy from the motor and charging the battery, or as an auxiliary motor drawing energy from the battery and assisting the engine or prime mover, at times when the load exceeds the average.

The principles and application of my invention are illustrated by the accompanying diagrams, of which—

Figure 1:
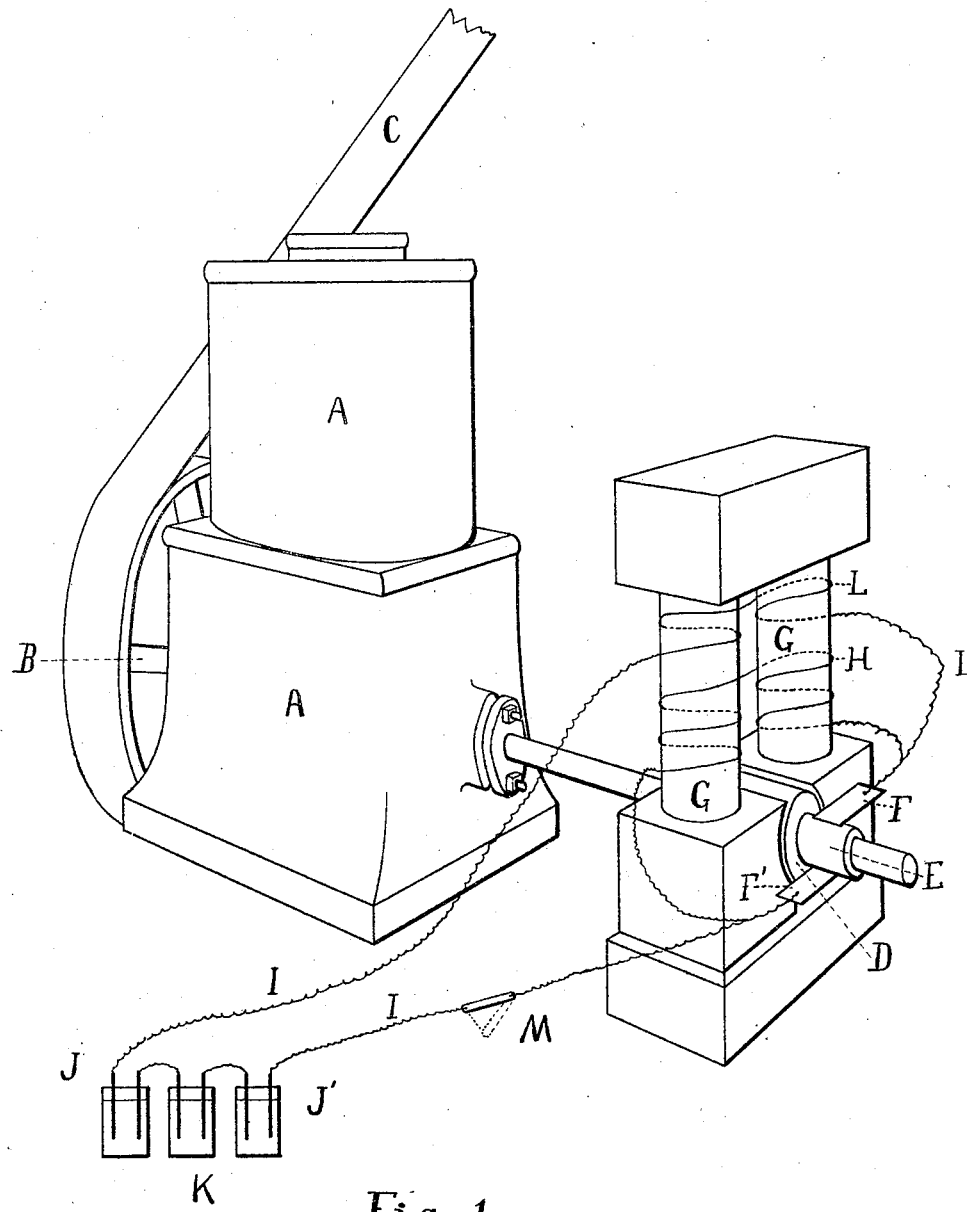
Figure 2:
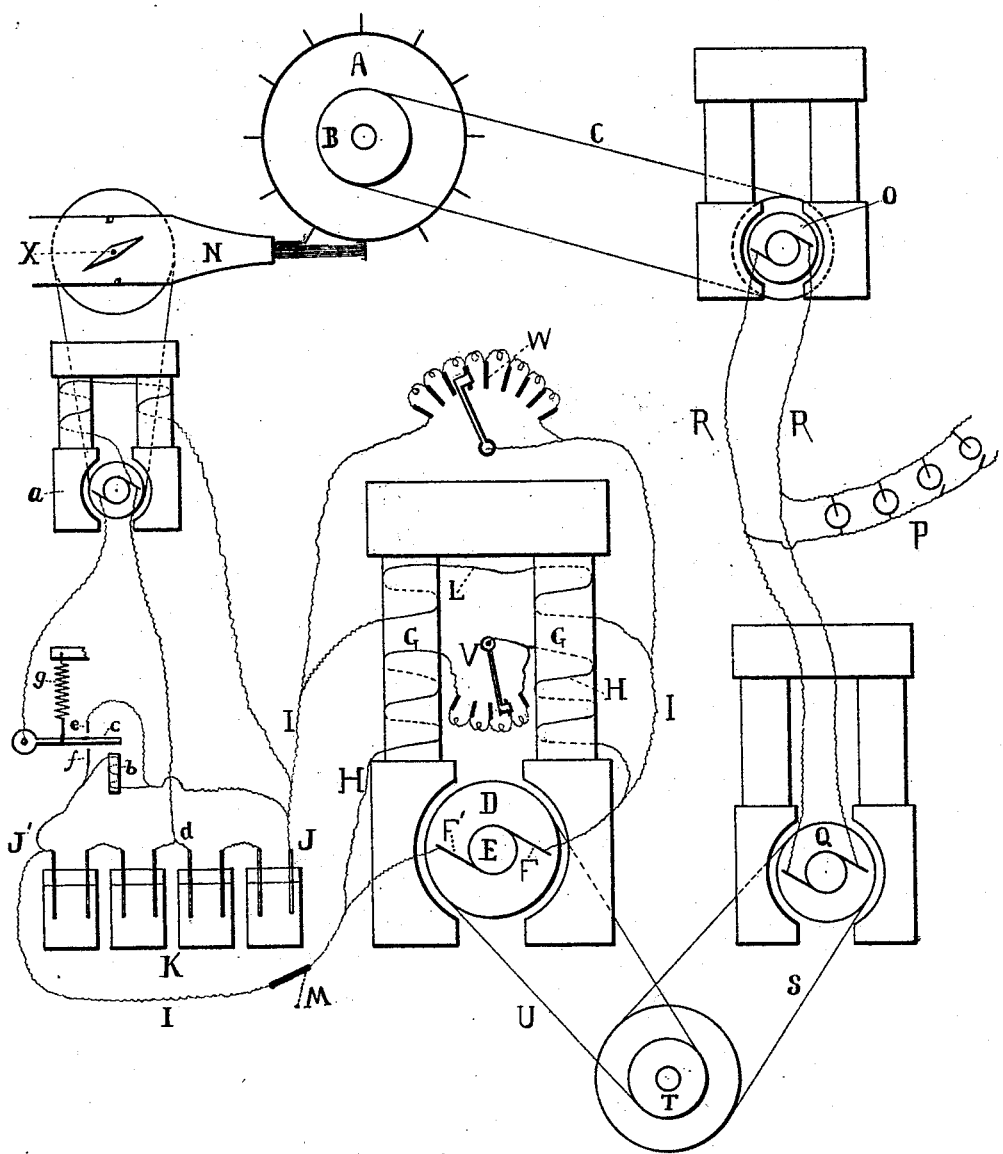

Figure 1 shows the regulator in a simple form applied to a steam engine, and Fig. 2 illustrates an application of it to a water motor, together with some additional features intended to secure finer regulation of speed, greater convenience, and adjustability to different conditions.

In Fig. 1, A is the motor whose speed and power are to be regulated, which is represented in this case as a vertical incased steam engine, but which might be equally well any kind of heat engine, water wheel, or other motor adapted to produce a rotary motion. On the main shaft of the motor is shown a band wheel B, from which a variable working load is supposed to be driven by the band C. Attached to the opposite end of the motor shaft is the armature of the regulator D, which is a dynamo of the so called direct current type, with commutator E, brushes F and F', and field magnets G.

H represents the principal magnetizing coils of the field magnets, which are connected in shunt with the main circuit, between the brushes F and F'. This method of connecting these coils I prefer as the simplest, though they may if preferred be energized from an independent source of electricity. The main circuit I connects the brushes F and F' with the two poles or terminal plates J and J' of the storage battery K. I prefer generally also to give this circuit a few turns around the field magnets, as shown at L, though this is not necessary.

M represents a switch for opening the circuit I when it is desired to stop the motor.

The operation of the regulator is as follows: Suppose the engine to be running at its normal speed, and with the average load on the driving belt C. The electro motive force of the battery K is such that under these conditions it balances that generated in the regulating armature D, so that no current flows in the circuit I, and scarcely any power is absorbed by the regulator. If now a portion of the load on the belt C is taken off, the engine speed increases slightly, raising the electro motive force of the regulating dynamo above that of the battery K, until enough charging current flows in the circuit I to absorb the surplus power of the engine. On the other hand, if a load exceeding the normal power of the engine is put on the belt C, the engine speed diminishes, bringing the electro motive force of the regulating dynamo down below that of the battery K, when the latter begins to discharge, sending a reverse current through the circuit I, which converts the regulating dynamo into an auxiliary motor, assisting the prime mover to carry the increased load. The change of engine speed necessary to produce the variation in electro motive force between that of charging and that of discharging the battery, is too great for very close regulation, unless some auxiliary means are used to assist in varying the electro motive force of the circuit I. Various means may be used for this purpose; for example, a rheostat, or variable resistance, may be employed in the shunt coils of the field H; but I prefer to accomplish this object by a compound winding, that is, by placing a certain number of the field coils of the regulating dynamo in series with the circuit I, as shown. These series coils are so wound and connected, that the magnetic effect of a current flowing in them, in the direction tending to charge the batteries, is added to the effect of the current in the shunt coils, thus increasing the strength of the field magnets and raising the electro motive force of the dynamo. Conversely, a current flowing in the opposite direction, opposes its magnetic effect to that of the shunt, and diminishes the electro motive force. By properly proportioning the series coils, the change of speed required to produce the required change in electro motive force may be reduced to any desired extent, and an exceedingly close and sensitive regulation obtained. This method of regulation I believe to be more economical in cases of extremely variable load than that of adjusting the quantity of steam or other working fluid supplied to the motor, because most motors run most economically at a certain definite rate of work, falling off greatly in efficiency if that rate is considerably departed from. For example, in the case of a steam engine having automatic cut-off regulation, and employed in such work as driving electric railway generators, the power usually fluctuates so continually and extremely that the steam is very seldom cut off near the best point in the stroke; whereas, with the form of regulator shown in Fig. 1, the engine could be run always at its most economical rate, which should conform to the average load upon it. As the fluctuations of load in the case referred to are mostly sudden and of short duration, a battery of small storage capacity would suffice for regulation in such a case; where the variations extend over longer periods, a larger battery would be needed; but the capacity of the battery can in any case be adjusted to fit the requirements.

I am aware that storage batteries have been used heretofore as a means of storing a surplus of current supplied to an electrical circuit, and of paying out that current again to the circuit when the supply from the dynamo has been cut off, or is insufficient to meet the demand; but their use in connection with a reversible electric generator-motor as a means of storing and restoring mechanical power, and thereby regulating the speed and power of a prime mover, without connection to any working electric circuit supplying lamps or the like, I believe to be new; and it is on the combination of these devices in the manner described for the purposes specified that I base my claim to the invention of a new and useful improvement in regulators for motors.

In Fig. 1 the regulating armature is represented as attached directly to the prime-mover shaft, but a less direct connection may be employed where it is more convenient. Fig. 2 illustrates a case where the regulator is driven indirectly through a combination of mechanical and electrical connections with the prime mover, which, in this case, is represented as a water wheel. Indirect driving of the regulator is often advantageous where power is transmitted by any method to perform a variable work at a considerable distance from the source, as it neutralizes fluctuations in the power transmitted, as well as in that generated by the prime mover.

In Fig. 2, A is the prime mover whose speed and power are to be regulated, to wit, a tangential water wheel, driven by a jet of water issuing from the nozzle N. In the case illustrated this motor is employed to drive a dynamo O by means of a band C. The variable working load consists of lamps P, motors Q, or other translating devices in the circuit R, supplied with current by the dynamo O. D is the regulating dynamo, which is connected by the belt U to the jack shaft T, driven by the motor Q through the belt S. The brushes F and F' of the regulator are connected with the terminals J and J' of the storage battery K, by means of the independent circuit I, in a manner similar to that of Fig. 1.

It will be seen that in the case illustrated by Fig. 2, power is transmitted between the prime mover A and the regulating armature D through the intervention of the belt C, electrical connection R, belt S, jack shaft T, and belt U. The jack shaft T may be used also to drive other machinery, or, instead of the jack shaft and belts, the armatures of the motor Q and the regulator D may be united on a single shaft. The special power-transmitting devices between the prime mover and the regulator are of no importance, these being chosen as an illustration of the numerous indirect connections that may be used. The current in the main circuit R, which is entirely disconnected from the regulating circuit I, may be either alternating or direct; and the dynamo O and motor Q may be of any type suitable to the current desired to be used.

The operation of the regulator, as arranged in Fig. 2, may be explained as follows:

When the prime mover is running under its normal, or average, load, the electro motive force generated in the armature D balances the electro motive force of the storage battery K, and no current flows in the circuit I. The regulator consequently consumes but very little power. If now a part of the working load be removed, as for example by cutting out a portion of the lamps P, or other translating devices in the circuit R, or by reducing the working load driven by the jack shaft T, the effect will be a tendency to accelerate the speed of the prime mover A, of the motor Q, and of the armature D, raising the electro motive force of the latter until a sufficient charging current flows in the circuit I to absorb the surplus power of the prime mover A. If on the other hand a load is put on the circuit R in excess of the normal capacity of the motor A and dynamo O, a slight reduction of speed results, which causes the battery to discharge through the circuit I, reversing the current through the armature of the regulator D and causing it to act as an auxiliary motor, assisting the motor Q, and the prime mover A in driving the jack shaft T. If the excess of load is in the external circuit R, the motor Q may be made to act as a dynamo driven by the regulator D, and to assist in supplying current to the circuit R. Auxiliary series windings L on the field magnets G of the regulator D are employed, as explained in connection with Fig. 1, in order to reduce the change of speed necessary to produce the required compensating effect to as small an amount as may be required.

In Fig. 2, a rheostat, or variable resistance V, is inserted in the shunt coils H of the field magnets G, by means of which the normal speed of the prime mover may be varied, or set at any desired rate, and the electro motive force on the working circuit R controlled, independently of that on the battery circuit I. A second rheostat W is shown connected as a shunt around the series coils L of the field magnets G, which provides a convenient means of varying the magnetizing effect of these series coils, and permits a close adjustment of the sensitiveness of the regulator. Neither of these rheostats is necessary to the successful operation of the regulator, but add to its convenience and adjustability to different conditions.

A third adjunct to the regulator, which may or may not be used, is the electrically controlled valve X, by which the supply of working fluid to the prime mover may be diminished or increased. The object of this device is to prevent injury to the storage battery K by overcharging or undue exhaustion, and its principle of operation is to reduce the supply of working fluid to the prime mover whenever the electro motive force of the battery exceeds a certain limit, thus causing the battery to be drawn upon to a greater extent; and to increase the supply of working fluid whenever the electro motive force of the battery falls below a certain other limit, thus producing sufficient surplus of power for charging.

A great variety of electrical devices are applicable to control the operation of the valve X in the manner described, one of the simplest of which is shown in the drawings; but I do not confine myself to the use of the special device shown. $a$ is an electric motor mechanically connected with the valve X, as shown, so that rotation in one direction will reduce the supply of working fluid to the motor, and rotation in the opposite direction will increase it. The polarity of the field magnets is constant, so that the armature will be turned in either one direction or the other, according to the direction of the current traversing it.

$b$ is an electro magnet wound with a coil of high resistance, and connected between the terminals of the battery J and J'. The armature $c$ of this magnet is electrically connected to one of the brushes of the motor $a$, the opposite brush being connected to the battery circuit at the point $d$. The magnetic armature $c$ is capable of movement between the electrical contacts $e$ and $f$, connected respectively to the terminals J and J', and the pull of the magnet upon it is balanced by a spring $g$ of such strength that when the electro motive force of the battery is between its allowed limits of variation, the armature $c$ occupies an intermediate position between the contacts $e$ and $f$. No current then flows through the armature of the motor $a$ and the valve X remains in its fixed position. If the electro motive force of the battery reaches its upper limit, the armature $c$ touches the contact $f$, and a current is sent through the armature of the motor $a$ in the direction tending to close the valve X. If the electro motive force reaches its lower limit, the armature $c$ touches the contact $e$, and a current is sent through the armature of the motor $a$ in the opposite direction, tending to open the valve X.

It is evident that the successful operation of my invention does not depend upon the particular means of connecting the shaft of the motor to be regulated with the armature of the regulator. For this purpose, any of the known means of transmitting a rotary motion may be employed; neither does it depend always upon the employment of auxiliary series coils on the field magnets of the regulating dynamo, as a sufficiently close regulation for some purposes is obtained without these coils; but the essence of the invention consists in the combination, with a prime mover, of a reversible electric generator-motor and storage battery on an independent circuit, for the purpose of regulating the speed or power of the prime mover, by alternately absorbing and giving out mechanical energy.

I therefore claim—

1. In a regulator for a motor or prime mover, the combination of a dynamo-electric machine, a secondary battery whose positive and negative poles are electrically connected respectively to the corresponding poles or terminals of the armature of the said dynamo-electric machine, so as to complete the external circuit thereof, and power-transmitting devices connecting the motor or prime mover with the said dynamo-electric machine, which acts alternately as a current generator, charging the battery, and as an auxiliary motor, driven by a reverse or discharge current from the battery, thereby absorbing any surplus mechanical energy generated by the prime mover in excess of that required by the work, and restoring such energy when the power used exceeds that exerted by the prime mover, substantially as set forth, and for the purposes described.

2. In a regulator for a prime mover, the combination of an auxiliary reversible-current electric generator or motor having a constant direction of rotation, suitable power-transmitting devices connecting the said auxiliary generator and the prime mover, so that the auxiliary generator may either oppose or assist the prime mover as may be required, and a secondary battery with its positive and negative terminal plates in electrical connection respectively with the corresponding terminals of the said auxiliary generator, which battery is charged when the power exerted by the prime mover is in excess of the working load, and discharged through the said auxiliary generator when the load opposing the prime mover exceeds the power exerted thereby, in such a manner as to neutralize or diminish the fluctuations of power of the prime mover, substantially as set forth, and for the purposes described.

3. In a regulator for a motor or prime mover, the combination of a dynamo-electric machine having shunt and series field windings and a constant direction of rotation, power-transmitting devices connecting the same with the motor whose speed or power is to be regulated, an electrical circuit traversing the armature of the said dynamo-electric machine and the said series field windings, a secondary battery in the said circuit, having its positive and negative poles connected respectively to the terminals of like polarity of the said dynamo-electric machine, which battery is charged by reason of the superior electromotive force generated in the said armature when the power exerted by the prime mover exceeds what is required for other purposes, and which assists the prime mover by discharging a reverse current through the said armature, when the power required exceeds that exerted by the prime mover, substantially as set forth, and for the purposes described.

4. In a regulator for a prime mover, the combination of an auxiliary dynamo-electric machine having a constant polarity and direction of rotation, suitable power-transmitting devices connecting the armature of the said dynamo-electric machine with the prime mover, an external circuit traversing said armature, a secondary battery in said circuit having its positive and negative terminal plates connected respectively to the terminals of like polarity of the said armature, the said battery serving to absorb any excess of energy exerted by the prime mover, and to supply, through the motor action of said armature, any deficiency in the power of the prime mover, and a rheostat or equivalent device in the field circuit of the said dynamo-electric machine, whereby the strength of its magnetic field is adjusted, for the purpose of regulating the speed or power of the prime mover, substantially as described.

5. In a regulator for a motor or a prime mover, the combination of a reversible-current rotary electric generator or motor, having shunt and series field windings and a constant direction of rotation, suitable power-transmitting devices connecting the armature of the said generator or motor with the prime mover, a secondary battery whose positive and negative poles are connected respectively to the corresponding poles or terminals of the said generator, which absorbs any excess of energy exerted by the prime mover, and assists the prime mover by discharging a reverse current through the said armature when the power required exceeds the power exerted by the prime mover, and a rheostat or variable resistance connected in shunt with the said series windings, substantially as set forth, and for the purposes described.

6. The combination of an engine or prime mover, an auxiliary reversible-current dynamo-electric machine having its armature on the same shaft or otherwise connected therewith, so as to run at a speed corresponding or proportionate to that of the prime mover, a storage battery, and an independent electrical circuit including the armature of said auxiliary dynamo, and the said storage battery, for the purpose of regulating the speed or power of the prime mover by alternately absorbing and reproducing mechanical energy, substantially as set forth.

7. The combination of an engine or prime mover, an auxiliary rotary electric generator or motor having shunt and series field windings, suitable power-transmitting devices connecting the same with the prime mover, an electrical circuit traversing the armature of the said generator or motor and the said series field windings, a secondary battery in said circuit having its positive and negative poles connected respectively with the terminals of like polarity of the said auxiliary generator or motor, which battery is charged by reason of the superior electro-motive force of the auxiliary generator when the power exerted by the prime mover is greater than that used in other ways, and which assists the prime mover by discharging a reversed current through the said circuit when the power required exceeds that exerted by the prime mover, thereby steadying the operation of the prime mover, substantially as set forth.

8. The combination of a primary motor, an auxiliary rotary electric generator or motor, having shunt and series field windings, power-transmitting devices connecting the same with the primary motor, an electric circuit traversing the armature of the said auxiliary generator or motor and the said series field windings, a storage battery in the said circuit, having its positive and negative poles connected respectively to the terminals of like polarity of the said auxiliary generator, which battery, through the medium of the auxiliary generator, alternately absorbs any excess and supplies any deficiency in the power of the primary motor, a rheostat or variable resistance in circuit with the shunt coils of the said field windings, by which the rate of the primary motor may be set or controlled, and a rheostat connected in shunt with the series coils, by which the allowed variation in the rate of the primary motor may be adjusted, substantially as set forth.

9. The combination of a prime mover, a dynamo electric machine driven thereby, an external electric circuit energized by the said machine, one or more motors or other translating devices in the said circuit, supplying a variable demand for power, an auxiliary rotary electric generator driven by power derived from said circuit, an independent circuit traversing the armature of the said auxiliary generator, and a storage battery in the said independent circuit, which, through the medium of the said auxiliary generator, alternately absorbs the excess of energy exerted by the prime mover, and restores the same to the system, in such a manner as to regulate the power or speed of the prime mover, substantially as set forth.

10. The combination of a motor or prime mover, an auxiliary electric generator and a secondary battery connected as set forth for regulating the speed or power thereof, and electrically-operated valves, controlling the supply of working fluid to the said motor or prime mover, substantially as set forth and for the purposes described.

In testimony whereof I have hereunto affixed my signature in the presence of two witnesses.

HORACE B. GALE.

Witnesses:
CARLTON M. CORNWELL,
B. S. ANSLEY.